Nov. 16, 1926.

R. W. BRADEN ET AL 1,607,576

CIRCULAR VALVE

Original Filed March 7. 1923   4 Sheets-Sheet 1

Inventor
Charles Stern &
Richard W. Braden,

By J. R. Bowen
Attorney

Nov. 16, 1926. 1,607,576
R. W. BRADEN ET AL
CIRCULAR VALVE
Original Filed March 7, 1923 4 Sheets-Sheet 2

Inventor
Charles Stern &
Richard W. Braden,
By J. R. Bowen
Attorney

Nov. 16, 1926.

R. W. BRADEN ET AL 1,607,576

CIRCULAR VALVE

Original Filed March 7, 1923    4 Sheets-Sheet 3

Inventor
Charles Stern &
Richard W. Braden,
By
J. R. Bowen
Attorney

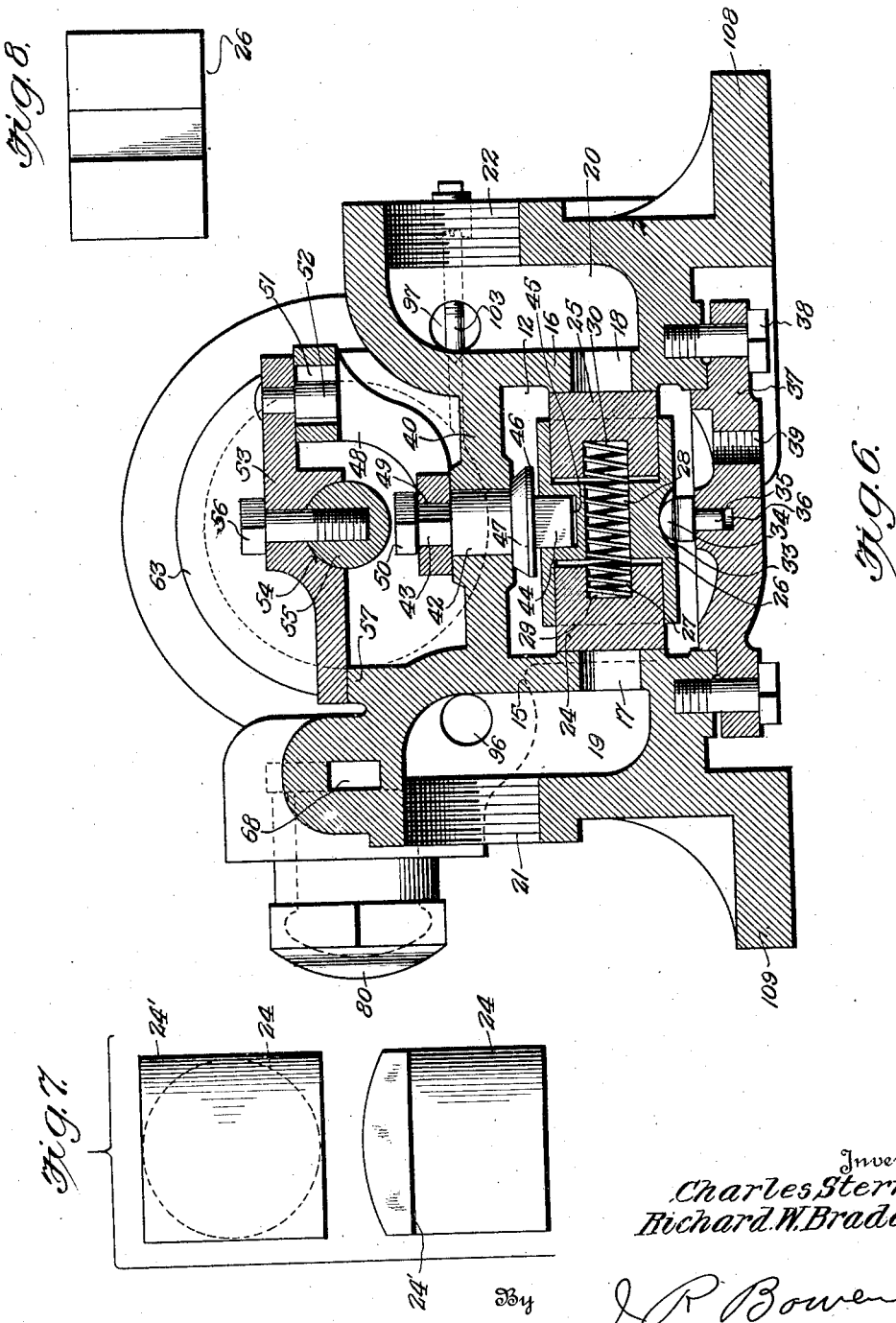

Patented Nov. 16, 1926.

1,607,576

UNITED STATES PATENT OFFICE.

RICHARD W. BRADEN, OF NEW YORK, N. Y., AND CHARLES STERN, OF JERSEY CITY, NEW JERSEY, ASSIGNOR TO B & S MANUFACTURING PRODUCTS CORPORATION, OF JERSEY CITY, NEW JERSEY, A CORPORATION OF NEW JERSEY.

CIRCULAR VALVE.

Original application filed March 7, 1923, Serial No. 623,525. Divided and this application filed June 21, 1923, Serial No. 346,852. Renewed June 18, 1926.

The present invention relates to improvements in circular valves and constitutes a division of our copending application Serial Number 623,525, filed March 7, 1923, now patented, Number 1,499,637, dated July 1, 1924, and entitled "Attachment for locomotives".

An object of the invention is to provide an improved valve useful in a drifting attachment for steam locomotives in which the movement of the valve will be at all times free and unopposed by any steam pressure and wherein the valve will always be seated accurately and without leakage.

Other objects of the invention are to provide an improved valve having a circular movement in conjunciton with valve-ways on the valve casing, the valve involving the use of blocks or shoes pressed outwardly against the valve-ways and continually held against such valve-ways despite wear; to provide a valve which will be responsive to its actuating device and which will be peculiarly adapted for use where relatively high steam pressure obtains and to so construct and arrange the valve that it may be coupled by convenient, simple and effective connections to the actuating device.

With the foregoing and other objects in view, the invention will be more fully described hereinafter, and will be more particularly pointed out in the claims appended hereto.

In the drawings, wherein like symbols refer to like or corresponding parts throughout the several views, Figure 1 shows a longitudinal horizontal section taken on the line 1—1 of Figure 6 through the locomotive attachment of which the circular valve forms a part.

Figure 6 is a vertical transverse section taken on the line 6—6 in Figure 1 through the drifting attachment and showing the circular valve in the closed position.

Figure 7 shows end and side views of the valve shoe, and

Figure 8 is a top plan of the valve block.

Figure 1:
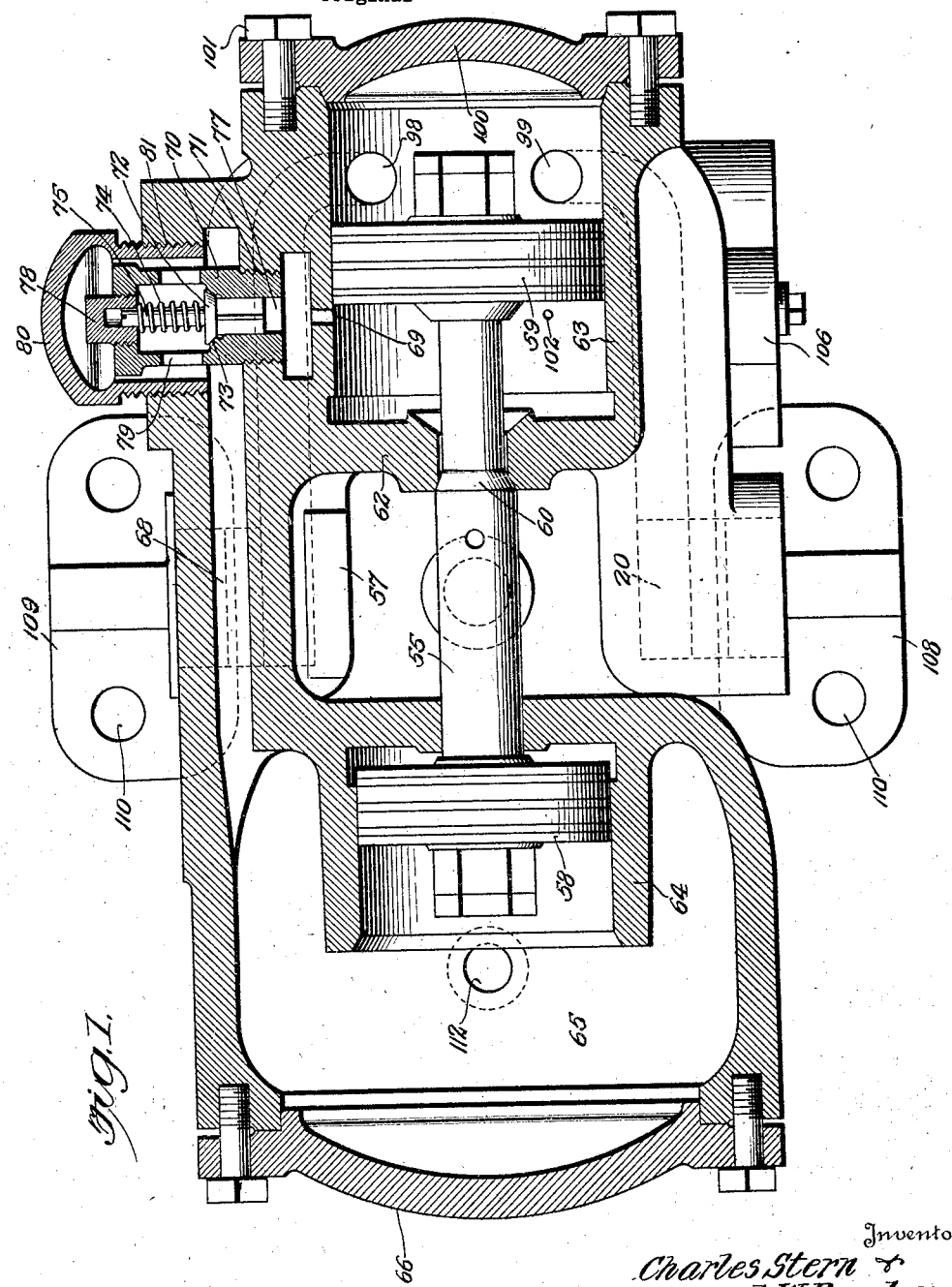

The drawing adequately illustrate the circular valve and its parts but only so much of the locomotive attachment is shown as will give an accurate idea of the particular use to which the valve is to be put.

Figure 4:
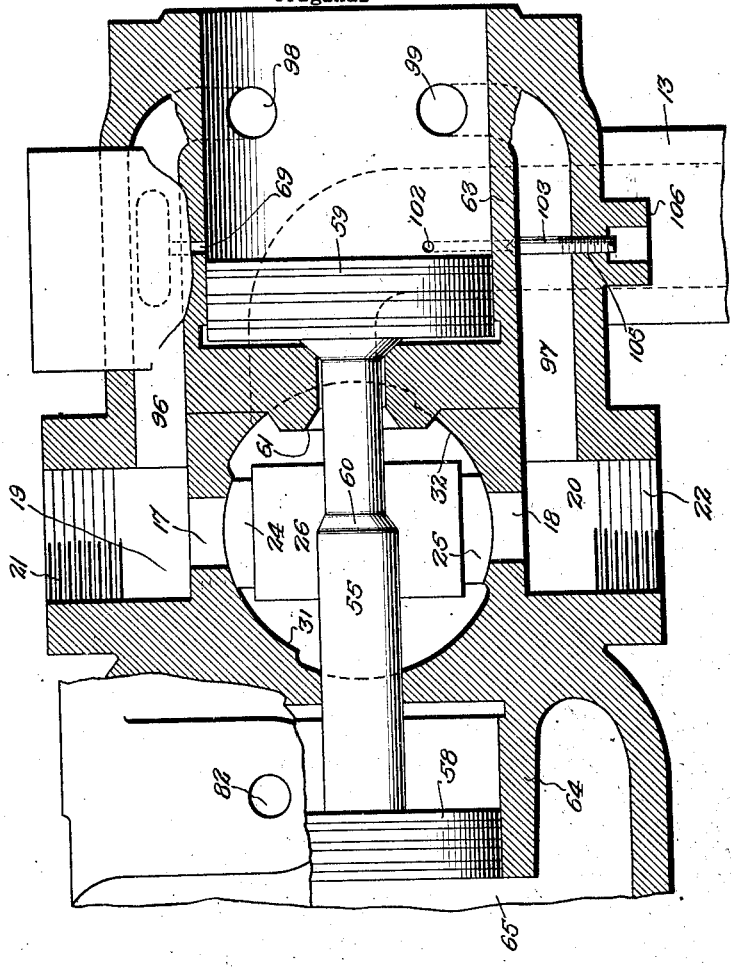
Figure 4 is also a diagram showing the pistons in a subsequent position and the valve closed.

Referring more particularly to the drawings the device comprises generally a casing in the lower central portion of which is a cylinder 12 which is in communication with a source of steam through a passage 13 shown in Figure 4 and to which a steam pipe may be coupled from the steam dome. The lateral walls 15 and 16 of the cylinder 12 are shown as provided with ports 17 and 18, respectively, whereby the interior of the cylinder may be placed in communication with the valve chests of the locomotive on which the device is placed; the object being to supply steam, with which the cylinder is at all times supplied, for instance directly from the boiler to the valve chests and cylinders of the locomotive in order to break any vacuum tending to occur therein when the throttle is closed and the locomotive moving and further to cushion the reciprocating parts and keep the surrounding metal at running temperature. The ports 17 and 18 just referred to are shown as opening outwardly upon channels 19 and 20 which rise vertically from the ports and have lateral outlets threaded as indicated at 21 and 22 to receive pipes by which the channels and the cylinder are in communication with the opposite steam chests of the locomotive, it being understood that a desirable location for the present device is between the steam chests and the saddle will probably provide the most convenient place on which to install said device.

The ports 17 and 18 are normally closed by valve shoes 24 and 25 which are shown as carried within recesses made within the valve block 26 which is journaled for circular movement upon a vertical axis within the cylinder 12. The valve shoes 24 and 25 are urged outwardly by a coil spring 27 shown as extending through passage 28 made centrally through the block 26, the ends of the spring engaging in sockets 29 and 30 in the inner faces of the valve shoes. The pressure of steam in the cylinder 12 against the corners of the valve shoes presses the valve shoes tightly against the wall of the cylinder 12. In this way the shoes are kept in close contact with the segments 31 and 32 (Figures 2 and 4) provided on the interior wall of the chamber to receive the outer edges of the valve shoes which are curved to correspond with the curvature of the chamber wall and said segments. As shown in Figure 6 the valve block is made with a socket 33 centrally beneath the same to receive the rounded head 34 of a stud having a shank 35 resting in a recess 36 in the bottom cover plate 37, which may be bolted or otherwise secured to the casing as by the fastenings shown at 38. The stud may be lifted out and replaced when worn or broken upon the withdrawal of the head 37 and the head also provided with a drain or outlet 39 for condensed steam. This outlet may be provided with any suitable condensation check.

Figure 2:
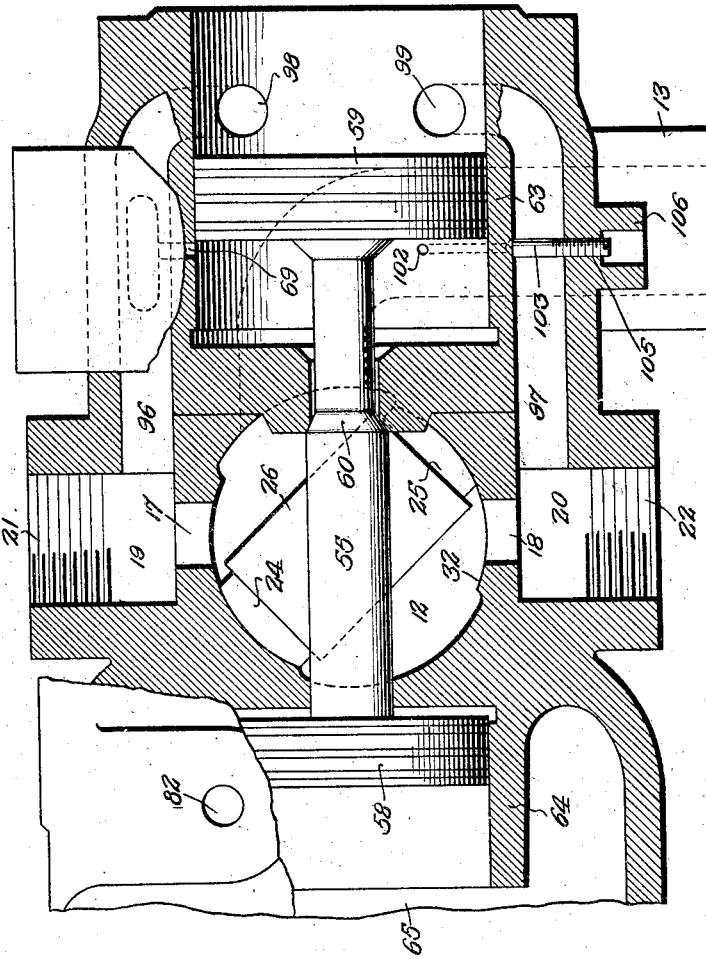
Figure 2 is a diagram showing parts in elevation and parts in section and indicating the relative positions of the actuating pistons when the valve is in the open position.

The steam received from the boiler into the cylinder 12 is prevented from escape while the valve shoes are in the position indicated in Figure 4, but when the block and the shoes are in the open position illustrated in Figure 2 the steam may escape through the ports and to the valve chests and cylinders of the locomotive through the system of passages already described.

We provide in conjunction with the valve an apparatus automatically controlled for shifting this valve to the open or closed position, and this movement of the valve is intended to bear a definite relationship to the closed and open positions of the throttle. In other words when the throttle is open steam is being delivered to the valve chests and cylinders as during the normal running of the locomotive, then the valve should be closed to avoid any interference of the steam. However, when the engineer closes the throttle and allows the locomotive to coast or drift or when the locomotive is being towed, it is desirable to have a supply of steam delivered to the valve chests and to the locomotive cylinders. We, therefore, provide a control device in conjunction with the valve for moving this valve in accordance with conditions within the steam chests. This device is described as follows:—

The top 40 of the cylinder 12 may be provided with a cylindrical bore 41 which may be reinforced by enlargements above and below, as shown in Figure 6; and in this bore there is shown as mounted the cylindrical enlarged intermediate portion 42 of a vertically disposed turning post. The turning post is shown as having a squared upwardly projecting stud 43 and a reduced and squared lower stud 44 projecting into the cylinder 12 and into a recess 45 made in the upper surface of the block 26 which is also shown as squared to correspondingly fit said stud. A shoulder 46 is shown as provided upon the turning post just beneath the cylindrical part and as having a rounded bearing 47 taking against the under side of the cylinder top 40.

A curved arm 48 is shown as connected with the top stud 43 of the turning post as by being provided with a square socket 49 to receive the stud. The arm is shown as confined upon the stud by a nut 50. The arm is shown as curved upwardly and away from the turning post and as slotted at its upper end, as indicated at 51, the length of the slot being radial with respect to the axis of the turning post. The slot is slidingly occupied by a downwardly projecting stud 52 shown as mounted upon one end of the arm 53 which may be rounded at its intermediate under side, as represented at 54, in order to snugly fit upon the piston rod 55, to which it is shown as secured by the screw 56 threaded into said piston rod. The other end of the arm is shown as resting slidingly upon a guide 57 which may be a part of the casing.

Figure 3:
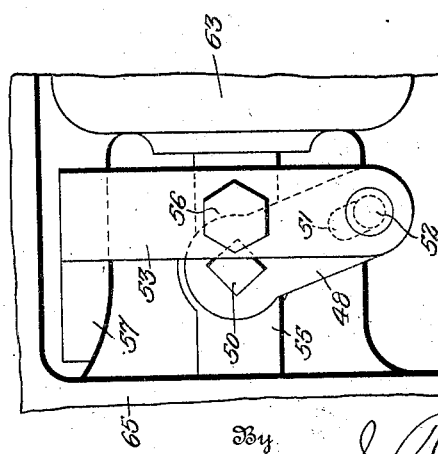
Figure 3 shows a plan view of the valve connections when the parts are as shown in Figure 2.
Figure 5:
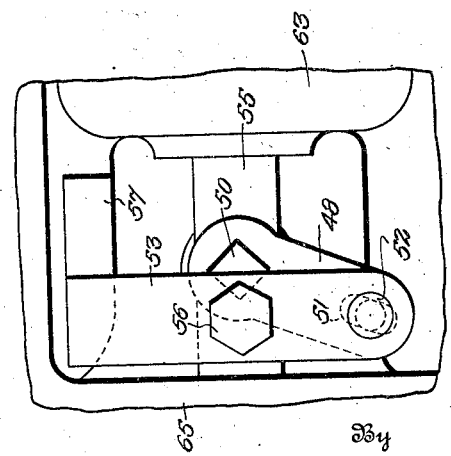
Figure 5 shows a fragmentary plan view of the connections in the left position corresponding to the position of the parts as seen in Figure 4.

The movement of the arms 48 and 53 is shown in Figures 3 and 5.

In Figures 1, 2 and 4 the piston rod is shown as made up of large and small diameters having pistons 58 and 59 coupled rigidly to the opposite ends thereof and shown as provided with a frusto conical valve face 60 at the intersection of the large and small diameters, which valve facing is adapted to cooperate with and close against a similarly formed valve seat 61, the reduced portion of the piston rod having a rather loose fit in the head 62 of a comparatively large cylinder 63. In this large cylinder 63 fits the piston 59 being also of comparatively large diameter. The companion piston 58, at the other end of the piston rod 55, is similarly mounted to reciprocate in an opposed cylinder 64 which is of smaller diameter compared to the cylinder 63. The remote or far end of the chamber 65 made in the shell or casing is closed as by a head 66 secured removably by the bolts or other fastenings 67 which enable the head to be taken off and access had to the interior of the chamber 65 and to the end of the piston rod.

The chamber 65 is shown as communicating by a passage 68 in the casing and extending longitudinally thereof with the other cylinder 63, in the side wall of which is shown a port 69 adapted to communicate with the cylinder 63 except when the piston covers said port. The port 69 is shown as communicating with the passage 68 through a check valve comprising a cage 70 threaded as indicated at 71 into an appropriate part of the casing and as being hollow and communicating interiorly with the port 69. A valve 72 is shown as mounted to reciprocate within the cage and to close normally against a seat 73 against which it is urged as by a coil spring 74 wound about the stem 75 which carries said valve 72. Guide wings 76 are shown as extending beneath the valve and as journaled in the cylindrical part 77 of the cage, while the outer end of the stem 75 may slide freely in a removable cap 78, by unscrewing which the valve assembly may be removed through the outer end of the cage. The interior space of said cage beyond the valve 72 is shown as provided with ports 79 through which steam may pass into the passage 68. There is shown a dome cap 80 having a threaded shank secured removably into a threaded opening 81 made laterally through the casing wall and entering upon the passage 68, the shank of the dome cap being shown as greater in diameter than the valve casing in order to provide an annular passage for the free transference of steam between these parts.

The chamber 65 which communicates with the passage 68 and with the remote end of the cylinder 64 is shown as ported as indicated at 82 to receive a relief valve.

As shown in Figures 2 and 4, the vertical passages 19 and 20 at the side of the cylinder 12 communicate with horizontally extending passages 96 and 97, which are shown as terminating in the large cylinder 63. Such outer end of the cylinder is shown in Figure 1 as closed by a removable head 100 secured in place by the bolts or other fastenings 101.

As shown in Figure 4 another port 102 enters the large cylinder 63 at an intermediate portion and this port is shown as communicating with the passage 97. A needle valve 103 may be arranged to cooperate with a seat 104 at the end of the port 102 adjoining the passage 97, this needle valve being shown as threaded at 105 in Figures 2 and 4 in the outer shell wall and as being protected by a surrounding socket 106 allowing the end of the needle to be adjusted.

The device is shown as provided with a base 108 and 109 having perforations 110 by which the device may be secured to the saddle of a locomotive or other appropriate part. It will be noted that the cylinder 12 is shown as occupying the center lower portion of the casting and that the cylinders 63 and 64 are shown as raised above the cylinder 12 and as located at the end portions of the casting in order that they may the better cooperate with the pin by which the valve in the cylinder 12 is moved.

When the engineer opens the throttle to start the locomotive steam from one of the steam chests enters at the passage 20 and thence flows through the passage 97 to the cylinder 63. Steam from the other steam chest enters at the passage 21 and thence flows through the passage 96 to the cylinder 63. Steam from the cylinder 63 forces the piston 59 over. When the piston 59 (which is larger than the piston 58) is forced over steam from the cylinder 63 enters the port 69 and the valve 72 is opened. When the valve 72 is opened steam may pass into the passage 68 and thence into the chamber 65. The device will remain in this position until the throttle is shut off. When the throttle is shut off steam from passage 68 presses against the larger area of the valve 72 closing the valve 72. When the valve 72 is closed no more steam can pass from the passage 68 into the chamber 65. Also when the valve 72 is closed the steam will be held in the chamber 65 until the piston moves over exposing the hole 82 leading from cylinder 64 to relief valve and atmosphere. The pressure of steam in the chamber 65 against the piston 58 will force the piston 58 over.

As the piston rod 55 moves over it carries over with it the arm 53. The movement of the arm 48 causes the turning post to turn and as this turning post is connected with the shut off block holder the valve shoes 24 and 25 are caused to move and thereby the ports 17 and 18 are opened up. When the port 17 is opened steam from the cylinder 12 may enter the passage 19 and from the passage 19 through 21 to one of the steam chests. The opening of the port 18 permits steam from the cylinder 12 to enter the passage 20 and from the passage 20 steam may go through 22 to the other steam chest.

In its movement the piston rod 55 carries with it the piston 59. When the piston 59 is moved over sufficiently far the port 102 will be in front of the piston 59 and steam from the cylinder 12 will enter the passages 17 and 18, 19 and 20, 97 and 96, and from the passage 97 will enter the port 102 and thence that part of the cylinder 63 which is in front of the piston 59. In this position the valve face 60 will impinge against the valve seat 61 and prevent the escape of steam at that point, but steam from the part of the cylinder 63 which is in front of the piston 59 may enter the passage 69 and raise the seat 73 and steam may then enter the passage 68 and go into the chamber 65 and thence into cylinder 64.

When the pressure of steam in the cylinder 64 exceeds a predetermined maximum, the relief valve connected to port 82 will open and the excess pressure be discharged.

On the reverse stroke of the piston 58 the relief valve port 82 in cylinder 64 is exposed allowing all the steam in chamber 65 to escape except say five pounds if the relief valve has been adjusted at five pounds. At this particular time this five pounds pressure in the cylinder 64 is sufficient to hold the piston 58. In addition the pressure in the cylinder 63 in front of the piston 59 also holds the piston 59 and with it the piston rod 55, and piston 58. Steam from the cylinder 63 also presses into the passage 69 and raises the seat 72 permitting steam to flow through passage 68 into the chamber 65, and when it gets to the chamber 65, the surplus pressure above say the five pounds is blown out through the relief valve.

When the locomotive is being brought to a stop steam from the steam chests backs up through 22 and 21 and enters 19 and 20, and thence goes to 97 and 96 and into cylinder 63 striking behind the piston 59 and forcing the piston 59 over. The valve face 60 being then raised from the valve seat 61 any steam in the cylinder 63 in front of the piston 59 will be forced to exhaust. This movement of the piston 59 causes a movement of the piston 58 in the same direction and the discharge of steam through the relief valve will be shut off and such steam as remains in the chamber 65 may condense. Suitable ports may be provided to care for such condensed steam. And when the piston 59 moves over carrying with it the piston rod the shut off block shoes will close the ports 17 and 18, thereby shutting off the steam from cylinder 12.

Although steam is shown as entering the port 102 from the passages 97 we might, if desired, have a similar port 102 from the passage 96.

Referring to Figure 7 the valve shoes are shown as substantially square or having corners 24' exposed to the steam pressure within the cylinder 12, whereby this pressure acts to press the shoes tightly against the wall of cylinder 12 and avoids the escape of steam when the valve shoes are in the position indicated in Figure 5. The port 112 shown at is a condensation port.

It is obvious that various changes and modifications may be made in the details of construction and design of the above specifically described embodiment of this invention without departing from the spirit thereof.

What is claimed is:—

1. In combination with a reciprocating piston rod of a locomotive drifting valve, a casing in communication with a source of steam supply and having outlet ports distinct from the steam supply connection, said outlet ports being in communication with the steam chest of the cylinder, a rotary valve block in said casing, outwardly and yieldably pressed valve shoes carried upon said block for opening and closing the ports, a turning post journaled through the wall of said casing and having connection with said valve block for rotating the same, an oscillating lever connected to said turning post exteriorly of said casing, and an arm fixed to said piston rod and having a slidable connection with said lever.

2. In combination with the reciprocating piston rod of a locomotive drifting valve, a casing having a steam supply cylinder at an intermediate point beneath said piston rod, said steam supply cylinder having ports in communication with the steam chest of the locomotive and said steam supply cylinder being in communication independently of said ports with a source of steam supply, a circular valve in said steam supply cylinder adapted to open and close said ports, a turning post having a removable connection to said circular valve for rotating the same in opposite directions, said turning post being journaled through the roof of said steam supply cylinder, a curved and slotted lever fixed to the upper outer end of said turning post, and an arm secured to said piston rod and having a pin engaging the slotted portion of said lever.

In testimony whereof we affix our signatures.

CHARLES STERN.
RICHARD W. BRADEN.